(12) United States Patent
Sohail et al.

(10) Patent No.: US 12,045,211 B2
(45) Date of Patent: Jul. 23, 2024

(54) VERSATILE DATA REDUCTION FOR INTERNET OF THINGS

(71) Applicant: EMC IP Holding Company LLC, Hopkinton, MA (US)

(72) Inventors: Mohamed Sohail, Sheikh Zayed (EG); Karim Fathy, Cairo (EG); Robert A. Lincourt, Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/081,700

(22) Filed: Oct. 27, 2020

(65) Prior Publication Data

US 2022/0129426 A1 Apr. 28, 2022

(51) Int. Cl.
*G06F 16/215* (2019.01)
*G06F 16/23* (2019.01)

(52) U.S. Cl.
CPC ........ *G06F 16/215* (2019.01); *G06F 16/2379* (2019.01)

(58) Field of Classification Search
CPC ............................ G06F 16/215; G06F 16/2379
USPC .......................................................... 707/692
See application file for complete search history.

(56) References Cited

U.S. PATENT DOCUMENTS

| | | | | |
|---|---|---|---|---|
| 8,903,764 B2 * | 12/2014 | Patil | ................... | G06F 16/24578 707/692 |
| 8,972,405 B1 * | 3/2015 | Chaulk | ................. | G06F 16/182 707/808 |
| 9,817,832 B1 * | 11/2017 | Protopopov | .......... | G06F 16/128 |
| 9,871,851 B2 * | 1/2018 | Todd | .................... | G06F 9/45558 |
| 9,882,985 B1 * | 1/2018 | Esam | ...................... | G06F 16/27 |
| 9,910,742 B1 * | 3/2018 | Faibish | ............... | G06F 16/2379 |
| 10,789,002 B1 * | 9/2020 | Danilov | ................ | G06F 3/0608 |
| 10,810,162 B2 * | 10/2020 | Wong | .................. | G06F 16/1748 |
| 2010/0332454 A1 * | 12/2010 | Prahlad | ................... | G06F 16/41 707/696 |
| 2015/0052523 A1 * | 2/2015 | Raghu | ................. | H04L 63/0272 718/1 |
| 2016/0092312 A1 * | 3/2016 | Dornquast | ............ | G06F 21/604 707/692 |
| 2016/0110261 A1 * | 4/2016 | Parab | ..................... | G06F 16/137 707/692 |
| 2016/0344553 A1 * | 11/2016 | Chen | ...................... | G06F 16/278 |
| 2020/0057752 A1 * | 2/2020 | Tofano | .................... | G06F 16/22 |
| 2021/0073190 A1 * | 3/2021 | Bedadala | .............. | G06F 16/215 |

FOREIGN PATENT DOCUMENTS

EP 3668036 A1 * 6/2020 ......... G06F 16/2379

OTHER PUBLICATIONS

ATT is Reinventing the Cloud Through Edge Computing, http://about.att.com/story/reinventing-the-cloud-through-edge_computing.html, Jul. 18, 2017.

(Continued)

*Primary Examiner* — Amresh Singh
(74) *Attorney, Agent, or Firm* — Workman Nydegger

(57) ABSTRACT

One example method includes collaborative deduplication. A deduplication engine implemented at a cloud level collaborates or coordinates with an extension engine of the deduplication at an edge node. This allows data ingested at a node to be collaboratively deduplicated prior to transfer to the cloud and after transfer to the cloud.

16 Claims, 8 Drawing Sheets

(56) References Cited

OTHER PUBLICATIONS

Verizon's cloud-in-a-box pushes the edge with OpenStack—Blog, https://siliconangle.com/blog/2017/07/17/verizons-cloud-box-pushes-edges-openstack-openstacksummit. Accessed Oct. 2020.

Y. Li, Y. Chen, T. Lan, and G. Venkataramani, Mobiqor: Pushing the envelope of mobile edge computing via quality-of-result optimization, 2017 IEEE 37th International Conference on Distributed Computing Systems, 2017, pp. 1261-1270.

Cisco Global Cloud Index: Forecast and Methodology, 2016-2021 White Paper, https://www.cisco.com/c/en/us/solutions/collateral/service-provider/global-cloud-index-gci/white-paper-c11-738085.htm, Jan. 2018.

IDC Directions 2017: IoT Forecast, 5G & Related Sessions—Blog, http://techblog.comsoc.org/2017/03/04/idc-directions-2017-iot-forecast-related-sessions/, 2017.

Lihong Jiang, et al., An IoT-Oriented Data Storage Framework in Cloud Computing Platform IEEE paper, May 2014.

https://support.emc.com/docu96462_CloudBoost-19.2-Release-Notes.pdf?language=en_US, Nov. 15, 2019.

* cited by examiner

VERSATILE DATA REDUCTION FOR INTERNET OF THINGS

FIELD OF THE INVENTION

Embodiments of the present invention generally relate to data protection and data reduction. More particularly, at least some embodiments of the invention relate to systems, hardware, software, computer-readable media, and methods for operations including data protection operations, data reduction operations and data deduplication operations.

BACKGROUND

The Internet of Things (IoT) includes, in a broad sense, anything connected to the Internet. The things connected to the Internet are expanding in many directions and in many different and diverse fields. In fact, the number of devices connected to the Internet has more than doubled since 2011. These devices are generating an ever-increasing amount of data and the number of devices or applications connected to the Internet is expected to increase substantially.

This presents a serious problem: how to handle and manage all the data generated by all of these devices. For example, the amount of data stored in edge facing devices is expected to reach 5.9 Zetta bytes (ZB) by 2021.

Various communication companies are building edge cloud infrastructure to support IoT data management applications. In addition to the computing resources needed to simply ingest the data being generated, there is also growing concern about how to store all of the data. This is not insignificant and real-time business processes may also be impacted at least because of the cost of storing large amounts of data. The challenges facing the IoT today include at least ingesting data, data storage management, resource allocation, and resource scarcity.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
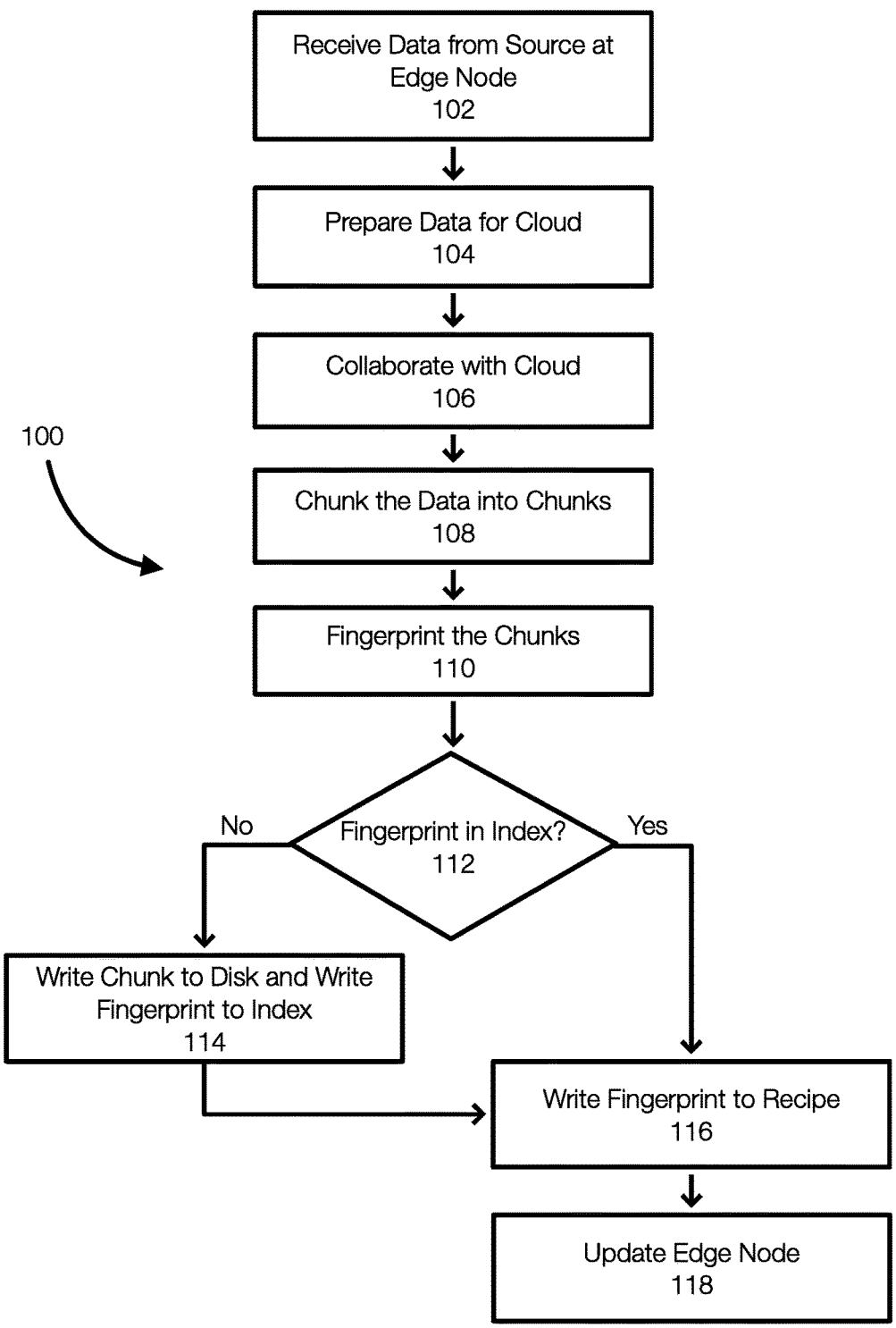
FIG. 1 discloses aspects of collaborative data deduplication.

Embodiments of the present invention generally relate to data related operations including data protection and data management. More particularly, at least some embodiments of the invention relate to systems, hardware, software, computer-readable media, and methods for data protection and/or management operations including, but not limited to, data reduction operations, data deduplication operations, IoT operations, edge computing operations, datacenter or cloud operations, or the like or combination thereof.

As previously stated, IoT devices are generating massive amounts of data and there is a need to ingest and process this data. For example, a smart field of sensors may have a sensor every 1 to 10 meters. This could result in 1 million sensors for a 10 km$^2$ field. If each sensor generates about 1 kB of data (e.g., temperature, humidity, time, location) every minute, more than 1 TB of data may be generated each day. This may be a small amount of data when compared to the data generated by more data-intense devices, such as video generating devices.

Data ingested from IoT devices provides many benefits. The ingested data may be accessed by various users and various locations. In fact, the data may be accessed globally and may also be used for different purposes. Video data, for example, can be used for promotional purposes, augmented reality, surveillance, entertainment, data mining, machine learning, and other purposes. IoT data can, once stored and shared, be easily accessed and used or analyzed by different organizations/entities and for a wide variety of purposes.

More specifically, data generated by IoT devices (also referred to as edge devices or applications) such as applications, sensors, smartphones, tablets, appliances, etc., once ingested to the cloud, can be distributed or replicated to various datacenters or sites. Users and applications can access and use the data. Often, the data may be accessed in read mode.

In addition to ingesting and storing very large amounts of data, use of the data in the cloud may also generate additional data. In light of massive amounts of data that may be generated (both at the edge and in the cloud) and shared, embodiments of the invention relate to managing this data. In particular, embodiments of the invention are able to perform operations such as collaborative data reduction or collaborative data deduplication. Edge nodes, which ingest IoT or other data from edge devices, are provisioned with a data protection layer that allows the edge nodes to collaborate with a cloud-based layer to perform collaborative data reduction and/or deduplication operations.

Embodiments of the invention allow the cloud layer to collaborate with individual edge nodes and/or with groups of edge nodes in order to achieve higher deduplication rates and to improve bandwidth utilization (data reduction). The ability to deduplicate locally at the edge nodes and/or centrally or globally at the cloud level ensures that less data is sent over the network and ensures that deduplication efficiencies are improved. In addition, embodiments of the invention also reduce storage costs in light of the improved deduplication efficiencies. This has a beneficial impact on other operations such as data protection operations, copy operations, and replication operations locally and/or in the cloud.

Embodiments of the invention are further configured to leverage the patterns found in IoT data. The patterns allow duplicate data to be identified, even if not yet deduplicated.

FIG. 1 illustrates an example method of collaborative deduplication. Initially, data is received 102 from a source in the method 100. Edge devices are examples of data sources and data from these sources may be received at an edge node or edge cloud. The data may be organized as, for example, files or datasets. The data is prepared 104 for the cloud. Preparing 104 the data may include determining whether a particular file or dataset has been previously transmitted to the cloud. If a file or dataset has been previously transmitted, it may only be necessary to transmit a pointer or other small representation of the file or dataset. This advantageously reduces network traffic.

Once the data is prepared or processed, the edge node and the cloud may collaborate 106. For example, the edge node may send a list of files or datasets that are new from the perspective of the edge node. The edge node may consult a local catalog, for example, that stores records or identifiers of files and datasets previously sent. The list may be generated after consulting the local catalog. The cloud uses this list to determine whether there is deduplication potential with regard to the list of data received from the edge node.

As part of the collaboration 106, the cloud identifies which files or datasets from the list the edge node should transmit. The data identified by the cloud is sent to the edge node and the corresponding data is transmitted. Other data at the node can be discarded because that data is duplicative. However, a pointer or other reference to the data being discarded or not transmitted is provided and stored in the cloud.

The data received at the cloud can be further deduplicated. In one example, the data is chunked 108 into chunks. Often, the chunks may have a consistent size (to aid in deduplication) and the files may be chunked in a smart manner to increase the likelihood of finding duplicate chunks. After chunking the data, the chunks are then fingerprinted 110 or otherwise provided with a unique identifier. A fingerprint may be a hash of a chunk.

After fingerprinting the chunks, an index of fingerprints may be searched or accessed to determine whether the fingerprints are already present in the index (and thus duplicates). If the fingerprint is in the index (Yes at 112), this indicates that the chunk is a duplicate chunk that has already been stored. Thus, the duplicate chunk does not need to be stored. A pointer, however, or other metadata may be retained for various reasons (e.g., to reflect how many nodes generated that particular chunk and to prevent the chunk from being deleted inadvertently when a particular node or client deletes the corresponding file while another client still requires the chunk). When the hash of the chunk is found in the index, the fingerprint is added to a recipe 112 such that the file can be generated using the chunk that already exists.

If the fingerprint is not in the index (No at 112), the chunk is written to storage and the fingerprint is added to the fingerprint index. The fingerprint is then added to the recipe 116 as previously described such that the file can be reconstituted from its parts when needed. The edge node 118 may be updated to reflect the further deduplication achieved at the cloud.

More specifically, data generated by edge devices are deduplicated in a collaborative manner. The collaboration includes a deduplication engine (e.g., a cloud-based layer in the ingestion operation) operating in the cloud that collaborates with a deduplication engine extension engine operating on the edge nodes. This collaboration reduces or minimizes the data sent to the cloud. In some embodiments, the edge nodes may be clustered or organized into groups and the collaborative deduplication can be further improved.

Figure 2A:
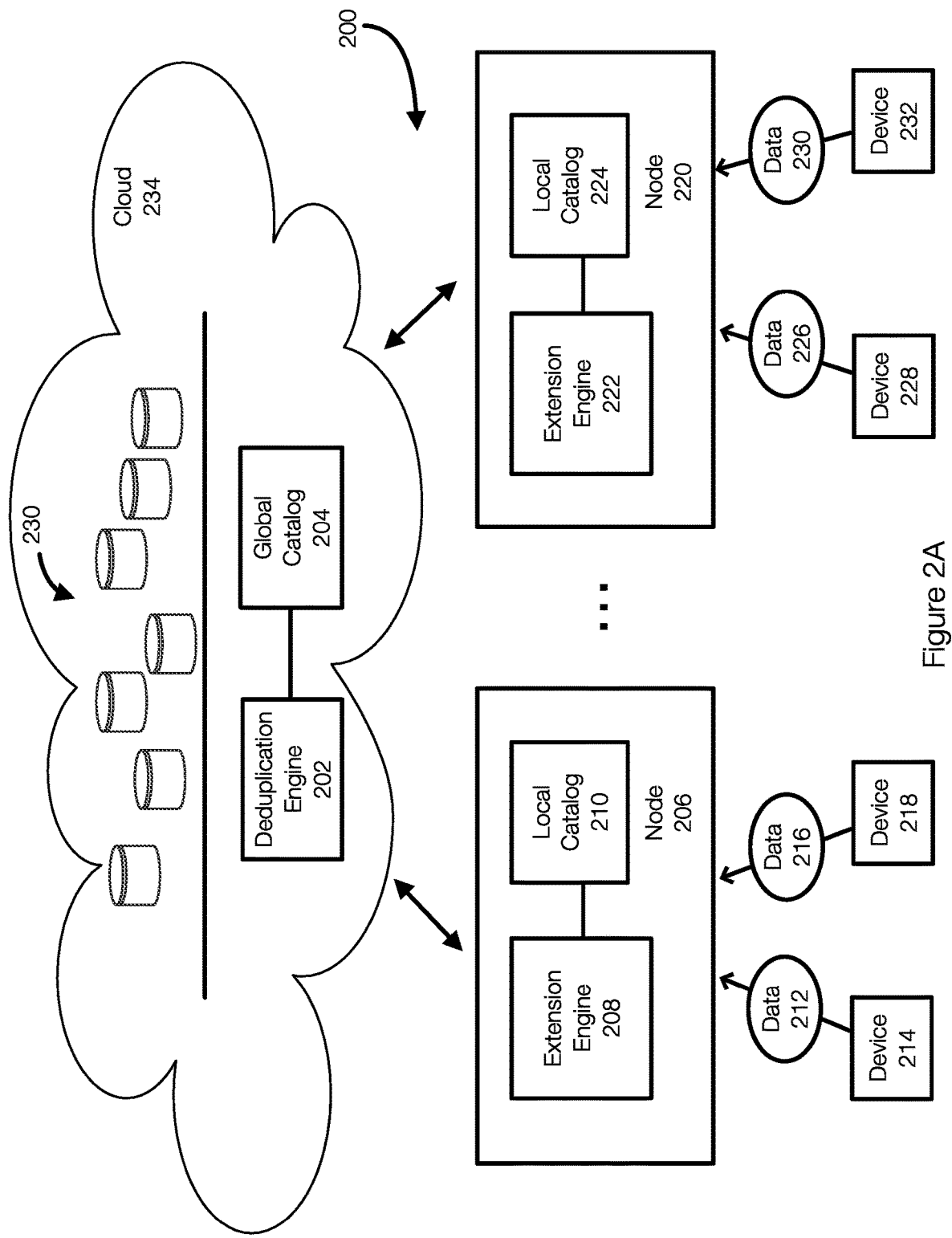
FIG. 2A discloses further aspects of a node based collaborative deduplication.

FIG. 2A illustrates an example of a data management or data deduplication system implemented in a computing environment that allows data to be collaboratively deduplicated. FIG. 2A illustrates a relationship between edge nodes, represented by nodes 206 and 220 and a cloud 234, which is representative of a cloud or of multiple clouds/datacenters or datacenter regions.

The cloud 234 may include storage 230 that is used to store data generated by edge devices. In this example, a cloud deduplication layer—the deduplication engine 202—may be implemented in the cloud 234. The deduplication engine 202 is associated with a global catalog 204, which may be an example of an index to data that has already been stored in the storage 230. The global catalog 204 may be an index of hashes of chunks of data. The deduplication engine 202 may be included in the data path between edge devices and the storage 230. The global catalog 204 may also store relationships between identifiers and datasets or files generated by the edge devices.

An extension engine 208 is implemented or installed on the node 206. The extension engine 208 is associated with a local catalog 210 that is an example of an index of hashes of chunks or files or datasets that the node 206 has previously seen or received from edge devices. The node 220 is similarly configured with an extension engine 222 and a local catalog 224.

In one example, the deduplication engine 202 is associated with a group of extension engines, represented by the extension engines 208 and 222. Thus, the global catalog 204 may be used to deduplicate data ingested by a group of nodes such as the nodes 206 and 220. In FIG. 2A, the extension engine 208 operates to collaboratively deduplicate data or files with respect to the node 206.

In this example, the devices 214 and 218 are edge devices that generate, respectively, data 212 and 216. The data 212 and 216 is ingested by the node 206, although other nodes may also ingest the data 212 and 216 in some examples. In one example, devices 214 and 218 may be clients of the extension engine 208. This allows the extension engine 208 to track and label the files/datasets received from the devices 214 and 218.

The device 214 and 218 may be, by way of example only, edge devices or applications that generate data ingested into or by the node 206. The devices 214 and may be IoT devices such as, but not limited to, sensors, smartphones, cameras, applications, or other devices or applications that may generate data that is sent to and stored in the storage 230 of the cloud 234. The devices 228 and 232 similarly generate data 226 and 230 that is ingested by the node 220.

Embodiments of the invention use the data transfer capabilities of the nodes 206 and 220 after applying the collaborative deduplication functions and services of the extension engines 208 and 222. The extension engines 208 and 222 are configured to handle the data 212, 216, 226 and 230 and are configured to interface with or interact the deduplication engine 202, for example using application programming interfaces (APIs) or appropriate calls or using other protocols.

The data deduplication engine 202 operates as a broker or as an intermediary between the edge nodes and the storage 230. The deduplication engine 202 can coordinate data management with the extension engines 208 and 222. Before writing the data received from the nodes 206 and 220 to the storage 230, the deduplication engine 202 may perform another deduplication at the cloud level. The deduplication performed by the deduplication engine 202, however, can be performed from the perspective of all of the nodes associated with the deduplication engine 202 (e.g., the nodes 206 and 220). The deduplication engine 202 can also update the local catalogs 210 and 224.

In one example, data is transferred from the nodes 206 and 220 to the deduplication engine 202 in windows or in increments. The windows may be defined in different manners. For example, the extension engine 208 may process data based on time or based on the amount of accumulated data. Data may be sent periodically or as soon as a predetermined amount of data has been collected, after a predetermined amount of time, or in another manner. In one example, the nodes 206 are configured with sufficient hardware (e.g., processors and memory of different types) to process the data associated with a particular window and to maintain or persist the local catalog 210. The actual data, however, may not be persisted at the nodes 206 and 220 or may be persisted fora certain amount of time or may be discarded after the data is uploaded to the cloud 234.

Prior to transmitting data, the extension engine 208 performs a dataset or file identification process. The data 212 and 216 (e.g., files, datasets) received from the devices 214 and 218 can be compared to the local catalog 210 to determine whether any of the data 212 and 216 has been previously sent to the deduplication engine 202. The extension engine 208 may generate a list of files or datasets that are not found or referenced in the local catalog.

The deduplication engine 202 may use the list to determine whether the datasets or files in the list can be further deduplicated. If so, the datasets are sent to the deduplication engine 202 and deduplicated. Pointers are created for files or datasets that are not uploaded to the deduplication engine 202 and are discarded at the edge node 206. The extension engine 222 operates in a similar manner.

Figure 2B:
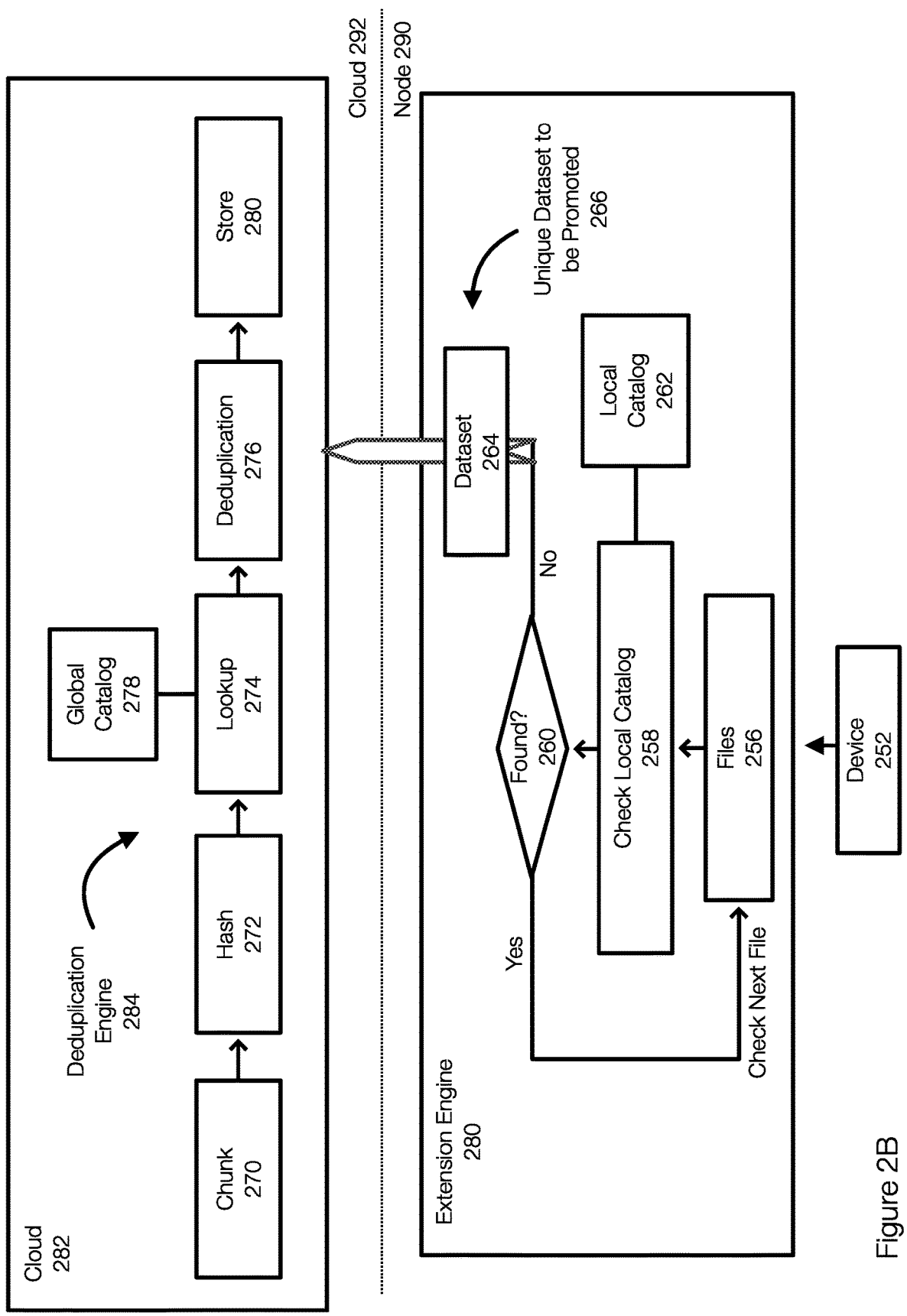
FIG. 2B discloses further aspects of node based collaborative deduplication.

FIG. 2B illustrates another example of node based deduplication. The deduplication in FIG. 2B ours based on collaboration between a node 290 and a cloud 292 or, more specifically, by a deduplication engine 284 running in the cloud and an extension engine 280 running on a node.

At the node 290, the extension engine 280 may receive datasets from the device 252. The extension engine 280 may receive data or datasets from multiple devices. The dataset is received as files 256. This may be a queue of files or a cache of files that have been received from the device 252.

As the files or datasets are received, the local catalog 262 is checked 258 to determine whether the dataset has been previously received. The local catalog 262 contains information that allows duplicate datasets to be identified.

If the dataset is found 260 in the local catalog 262, the next file or dataset in the files 256 is checked. If the dataset, such as the dataset 264, is not found or referenced in the local catalog 262, the dataset 264 is promoted 266 to the cloud. Alternatively, an indication of the dataset may be sent to the deduplication engine 284 and the deduplication engine 284 may instruct whether the dataset 264 should actually be promoted to the cloud 292.

If the dataset 264 is promoted and transmitted to the cloud 292, the deduplication engine 284 deduplicates the dataset 264. In one example, the deduplication engine 284 may include various components including one or more of chunking and addressing 270, hashing 272, lookup 274, deduplication 276, and store 280. Some of these functions may be performed by other aspects of the application rather than specifically the deduplication engine 284 (e.g., the lookup 274 and store 280 operations) may be performed by the cloud component of the deduplication system.

Once the dataset 264 is received, the deduplication engine 284 chunks 270 the dataset and then hashes 272 the chunks. The resulting hashes are looked up using the global catalog 278 to determine if the chunks of the dataset 264 are unique from the perspective of the cloud 282. During deduplication 276, duplicates are removed and the unique chunks are added to the store 280. The local catalog 262 may be updated based on at least the chunks that were added to the store 280. These updates, which may be based on datasets uploaded by multiple extensions to the deduplication engine 282, further improves the ability of the local catalog 262 to identify duplicate files or datasets received from the device 252.

Figure 2C:
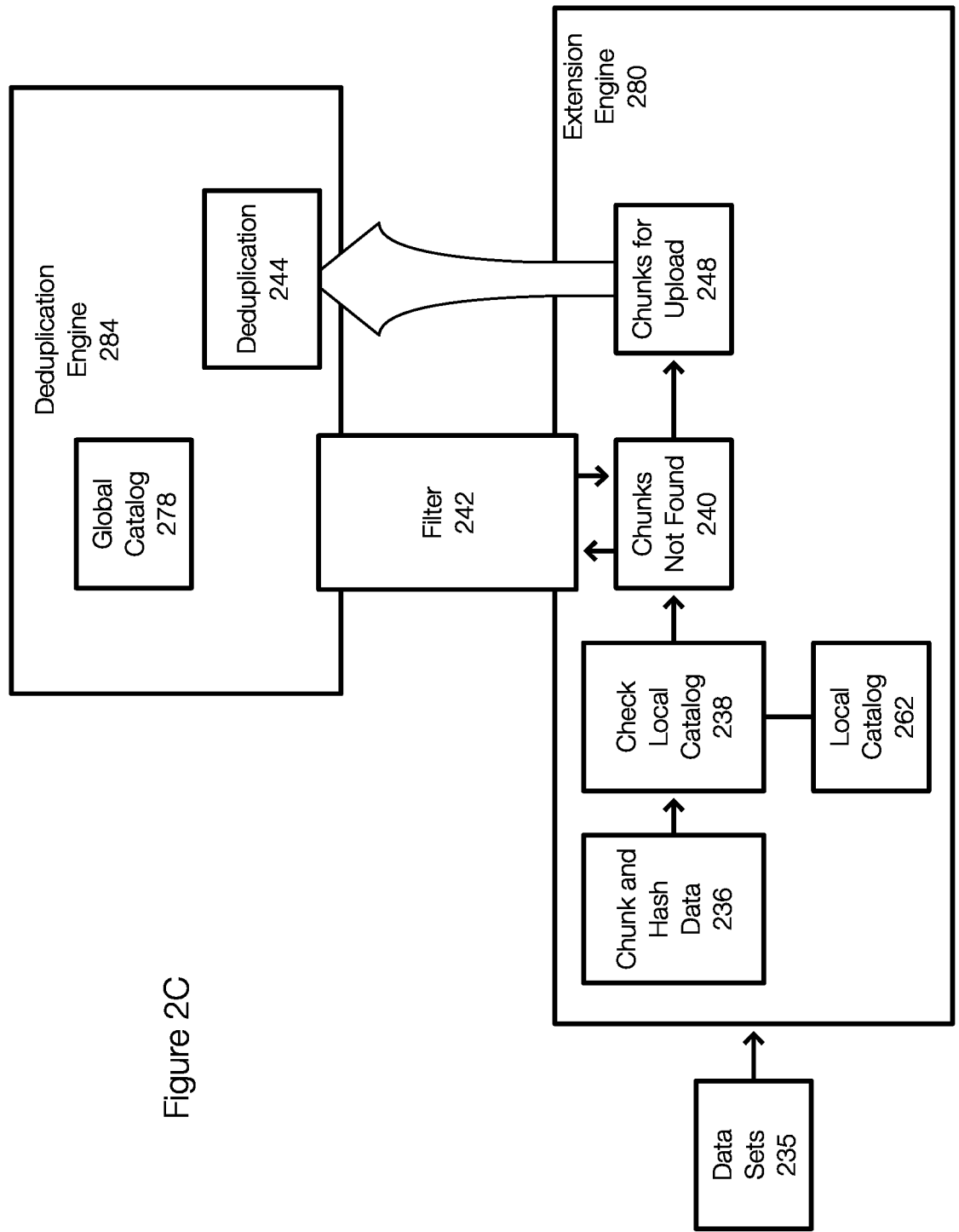
FIG. 2C illustrates further aspects of collaborative deduplication.

FIG. 2C illustrates further aspects of collaborative deduplication. FIG. 2C illustrates a deduplication engine 284 and an extension engine 280, which are examples, respectively, of the deduplication engine 202 and the extensions engines 208 and 222. FIG. 2C illustrates, in more detail the manner in which datasets or files are processed at the extension 280.

In this example, the datasets 235 (e.g., generated by devices as previously described) are chunked and hashed 236. More specifically, the chunking performed at the extension engine 280 is on a larger scale than any chunking performed by the deduplication engine 284. For example, the extension engine 280 may chunk the datasets into chunks whose size may be, by way of example, 1 or 2 megabytes. The chunking at the deduplication engine 284 may be, by way of example only, on the order of kilobytes or less than 1 megabyte. This facilitates an initial deduplication at the edge node and can be accomplished with less resource impact on the edge nodes.

The extension engine 280 checks 238 these hashes against the local catalog 262. Chunks that are not found 240 are identified. The hashes of these larger chunks can be filtered 242 by the deduplication engine using the global catalog 278. This allows the deduplication engine 284 to identify which of the chunks should be promoted or uploaded to the deduplication engine. Thus, the chunks that that are new from the perspective of both the extension engine 280 and the deduplication engine 284 are uploaded 248 to the deduplication engine 284. The deduplication engine 284 then performs further deduplication 244 as previously described by chunking into smaller chunks, generating a hash and using the global catalog to identify duplicates.

In this example, the global catalog 278 may maintain hashes for both the smaller chunks and the larger chunks. Once the larger chunks uploaded 248 for further deduplication have been processed, the local catalog 262 is updated to reflect that those chunks have been deduplicated. In one example, the local catalog is updated with the hashes of the larger chunks.

After deduplication by the deduplication engine, the deduplicated chunks may be compressed for optimal reduction and stored in the back end storage of the cloud.

Figure 3A:
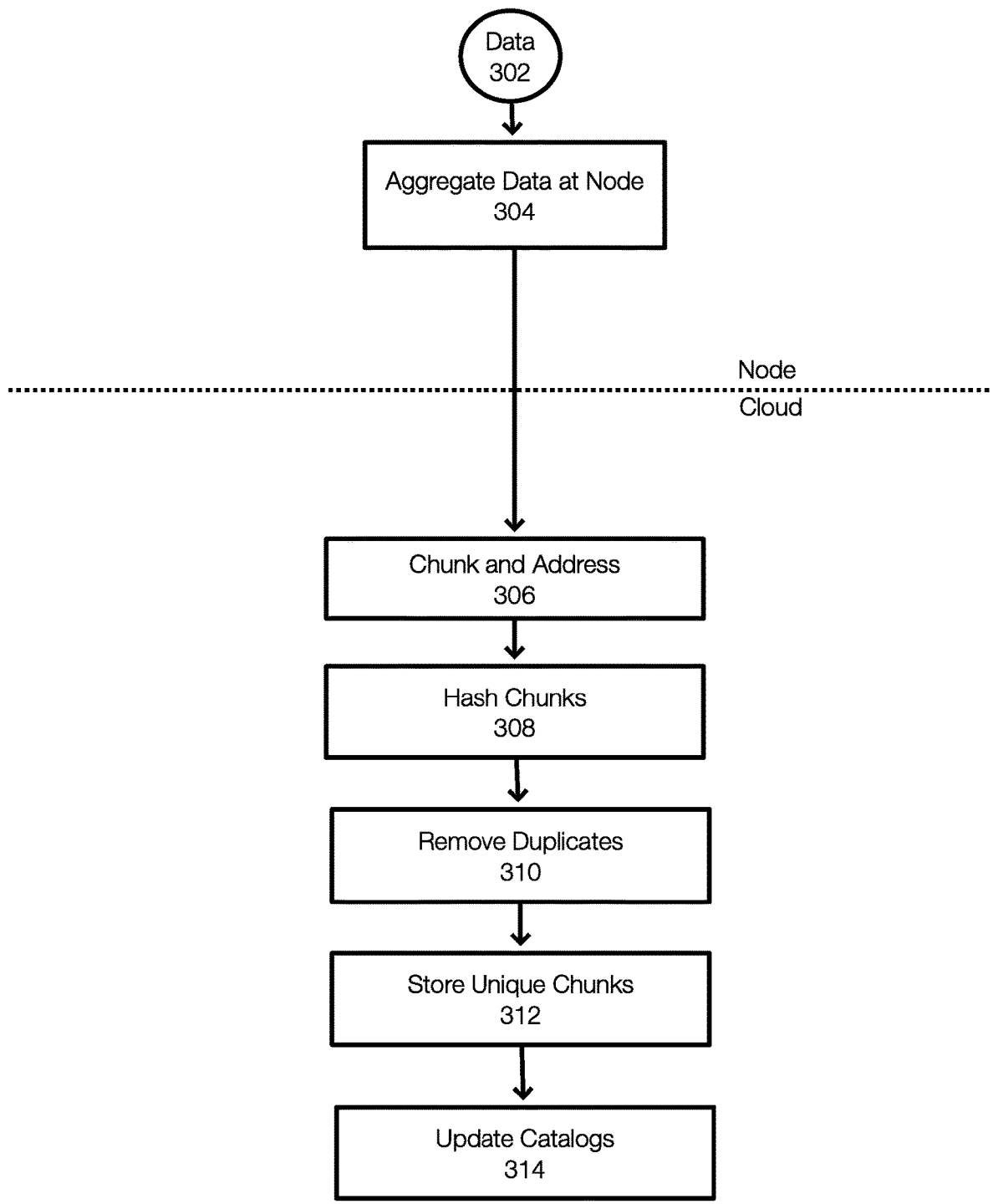
FIG. 3A illustrates an example of a method for initiating node based collaborative deduplication.

FIG. 3A illustrates an example of collaborative deduplication. FIG. 3A, more specifically, illustrates an initial collaboration or an initial transfer window between an edge node or an extension engine 222 and a deduplication engine. When the collaborative deduplication is initiated, data 302 received at an edge node is aggregated 304 or collected at the edge node for a certain time period or until a certain amount of data is collected. Alternatively, data or files received during the initial transfer window can be processed and transferred as they are received. Further, the files in the data 332, after processing at the node, may be batched and transmitted in batches to the deduplication engine.

During the initial transfer window, the node may not have any data in its local catalog. Thus, all of the data received during the initial transfer window are, in effect, new or unique to the node and are transferred to the deduplication engine. Even if there is some duplication in the data sent during the initial transfer window, this data will be deduplicated at the cloud layer for the initial transfer window. Alternatively, list of the data could be sent and the deduplication engine may respond with an indication of which data to upload. Thus, the edge node may receive and aggregate 304 data during the initial transfer window. When the initial transfer window is complete, the data is transferred to the deduplication engine.

When the deduplication engine receives the first or initial batch or batches of data, the data are chunked and addressed 306 by the deduplication engine. In other words, the data is chunked into chunks and an index address is given to each chunk. Next, the chunks are hashed 308 to obtain a hash for each chunk. The hash is an example of a fingerprint that uniquely identifies the corresponding chunk.

Next, a global catalog is updated to include the hashes of the chunks and other metadata, such as the location (e.g., location in storage) of the chunk in one example. The metadata may also identify the node that supplied the chunk to the deduplication engine. The metadata may also identify relationships between the hashes and the files or datasets included in the data. This ensures that the local catalogs can be updated with information that allows the extension engines to identify files or datasets that have previously been uploaded.

Assuming that the global catalog already includes some index information (e.g., hashes of chunks and associated metadata), duplicate chunks are removed 310 if present by comparing the hashes of the chunks being processed with the hashes in the global catalog. This may our for all of the nodes that provided chunks to the deduplication engine. After the chunks are deduplicated or removed 310, the unique chunks or chunks that have not yet been stored in the cloud storage are stored 312 in the storage of the cloud.

Next, the local catalogs are updated 314. Updating the catalogs may include sending the relevant portions of the global catalog to the local catalogs of the edge nodes. Thus, the local catalog of each edge node contains hashes and other metadata of chunks that have already been processed by the deduplication engine in the cloud and stored in the backend storage. In one example, the local catalog of a particular node is updated with respect to the data sent by that node. In other words, the local catalog of the particular node does not receive catalog information for files or data ingested by another node in one example. This allows the extension engine to identify subsequent data as duplicate.

Figure 3B:
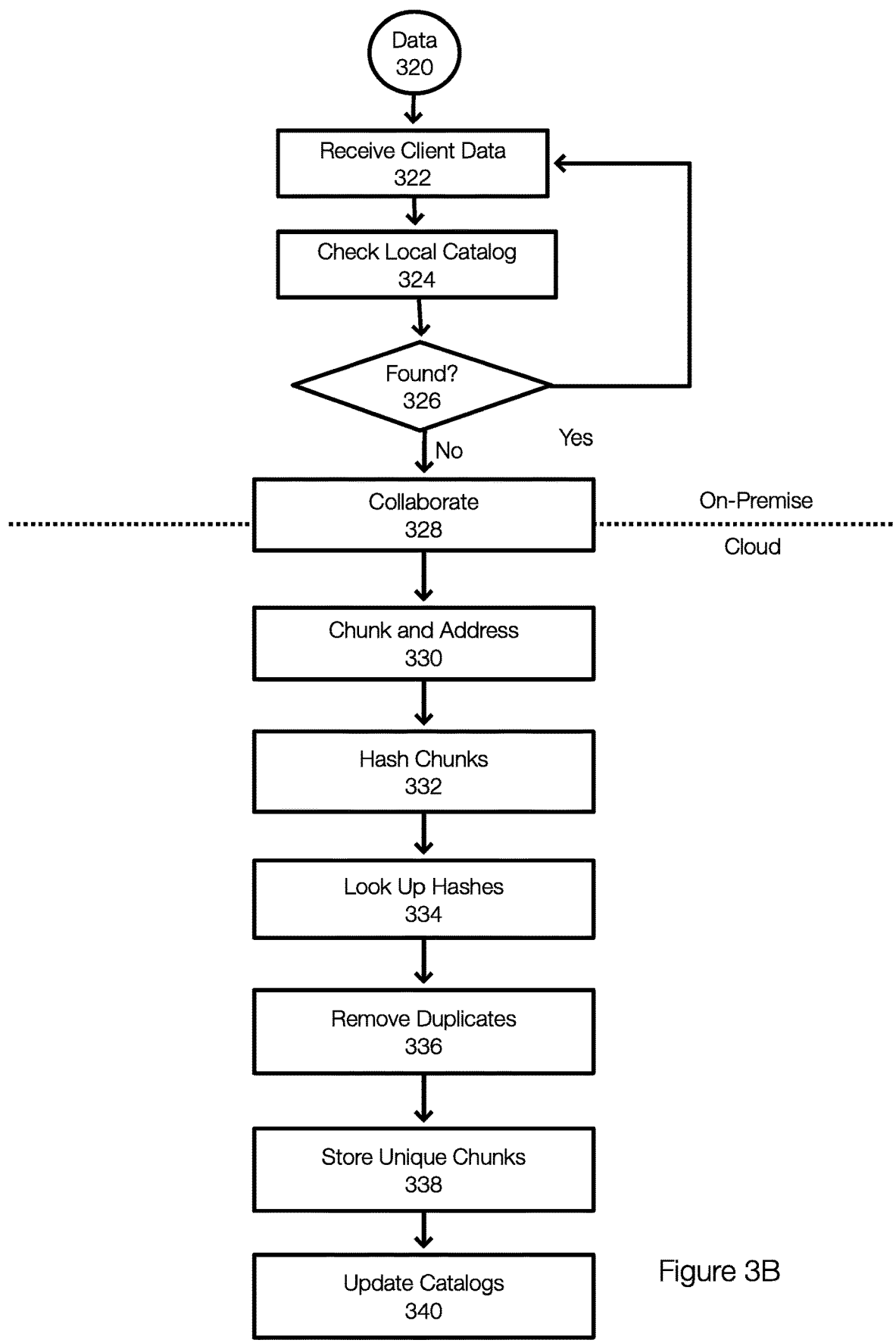
FIG. 3B illustrates an example of a method for performing node based collaborative deduplication.

FIG. 3B illustrates an example of collaborative deduplication after the global and local catalogs have been initialized based on an initial transfer window. FIG. 3B illustrates the process for the next and subsequent data transfer windows.

Data 320, which may include files or datasets, may be received 322 during a next transfer window at a node or by an extension engine. The data 320 from edge devices being ingested is more or less being constantly ingested. However, the data 320 may be processed based on windows as previously described. Thus, the data may be processed/stored in a cache or the like and may be transferred as files or in batches. For example, data being ingested may be processed until a cache is full or until a certain amount of time is passed. At that point, all data in the cache to be transferred to the deduplication engine is transferred to the deduplication engine. The next transfer window is then started and the next data handled similarly.

As the data are received at the node, each file or dataset is checked 324 using a local catalog. More specifically, each file (or other data organization, format, or package) is checked 324 at the edge node to determine if the file has been previously processed or previously uploaded. If the file is found (yes at 326) or represented in the catalog, the file is not new and is not sent to the deduplication engine (a pointer or other representation may be sent, however). The next data is then processed. If the file is not found (No at 326) in the local catalog, the file is transferred to the deduplication engine in the cloud as described herein.

In one embodiment, collaboration 328 is performed. In one example, collaborating 328 may include transferring data that, based on the local catalog, has not been uploaded to the deduplication engine to the deduplication engine. Alternatively, collaborating 328 may include sending a smaller package such as a list of data to the deduplication engine. The deduplication engine can evaluate the list using the global catalog. The edge node is then informed of which data on the list to send for deduplication at the deduplication engine. This advantageously reduces data transfer and allows both the edge node and the cloud layer to participate in the collaborative deduplication.

The local catalog may contain chunks or other metadata that allows duplicative data to be identified. This may include chunk hashes, groups of Although the edge node may chunk and deduplicate based on hashes, the edge node may simply identify duplicate files rather than duplicate chunks. When the local catalog is updated by the deduplication engine, the local catalog is updated to reflect files that have been sent to the cloud. As a result, the local catalog can be used to identify whether or not a file has been sent to the cloud or has not been sent to the cloud. When a file has already been sent to the cloud, a pointer may be sent instead in order to account for the file, even though the file is a duplicate.

Files not found in the local catalog or files identified by the deduplication from the list of files are then sent to the deduplication engine. The deduplication engine chunks and addresses 330 the new files from the node. The chunks are hashed 332 and the hashes are looked up 334 in or compared against the hashes in the global catalog. This allows the chunks that have already been stored (e.g., received from another node or previously stored by the deduplication engine) to be identified. Thus, duplicate chunks are removed 336 and are not stored (although metadata may be updated to reflect the copy that was a duplicate). The unique chunks for the current transfer window are stored 333836 in the backend storage. The local catalogs are then updated 340 with information that allows the extension mechanism to identify files or datasets that have been previously uploaded or deduplicated.

FIGS. 3A and 3B illustrate, with reference to FIG. 2A, that the extension engines 208 and 222 can check their local catalogs 210 and 224 to make a decision regarding a particular file or dataset. By way of example only, each edge node is only communicating new data to the deduplication engine. This allows the edge nodes to participate in or operation in a collaborative deduplication with the deduplication engine in the cloud. This can reduce bandwidth usage and reduce the amount of data transferred to the cloud. At the cloud, the new files can be deduplicated against files or data from other nodes. This further enhances the efficiency of the deduplication process.

Figure 4:
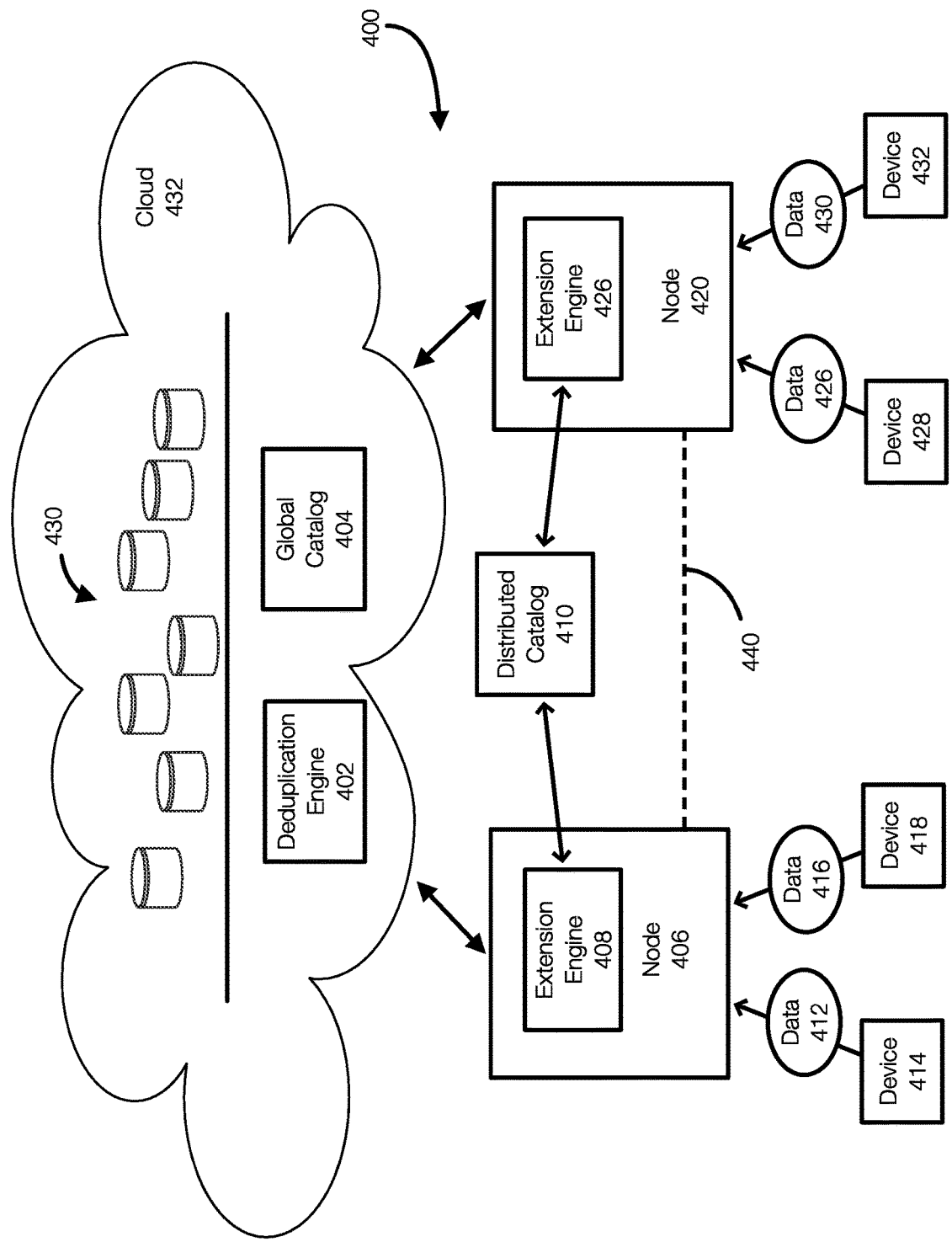
FIG. 4 discloses aspects of ring based collaborative deduplication.

FIG. 4 illustrates another example of collaborative deduplication. The elements shown in FIG. 4 are similar to the elements shown in FIG. 2A. FIG. 4, however, illustrates another example of collaborative deduplication. In FIG. 4, the nodes 406 and 420 are associated into a ring 440 or group of related nodes. The deduplication engine 402 may be associated with multiple rings.

All of the nodes in the ring 440, represented as nodes 406 and 420, share a distributed catalog 410. The rings of the deduplication system, including the ring 440, can be formed by partitioning the edge nodes into disjoint clusters or groups. The distributed catalog 410 may be implemented in a fault tolerant distributed key-value store. This may also be stored in a ledger, for example. In one example, the distributed catalog 410 is distributed across all of the nodes in the ring 440.

The ring 440 can maintain multiple copies of each node's catalog entries, depending on the replication factor of the distributed catalog 410.

The collaborative deduplication in FIG. 4 is thus performed on the basis of all nodes in the ring 440 rather than on a single node. For example, the data 412 and 416 from the devices 414 and 418 can be checked against files that may have been previously received from the devices 428 and 432 as data 426 and 430. When the extension engine 408 checks the files, the files in the data 412 and 418 is checked against the distributed catalog 410.

The lists generated by the extension engines 408 and 426 are thus based on more than one node. This may further reduce the amount of data that needs to be uploaded to the deduplication engine.

As a result, the files uploaded to the deduplication engine 402 by the extension engines 406 and 426 are unique to the ring 440, for at least the present transfer window. As a result, there is a higher probability of data transfer efficiency.

The deduplication engine 402 aggregates the files from the ring 440 (and from other rings) and can deduplicate the data across multiple rings. After deduplication, which is performed as previously described at the cloud level, the distributed catalog of each ring is updated.

Figure 5:
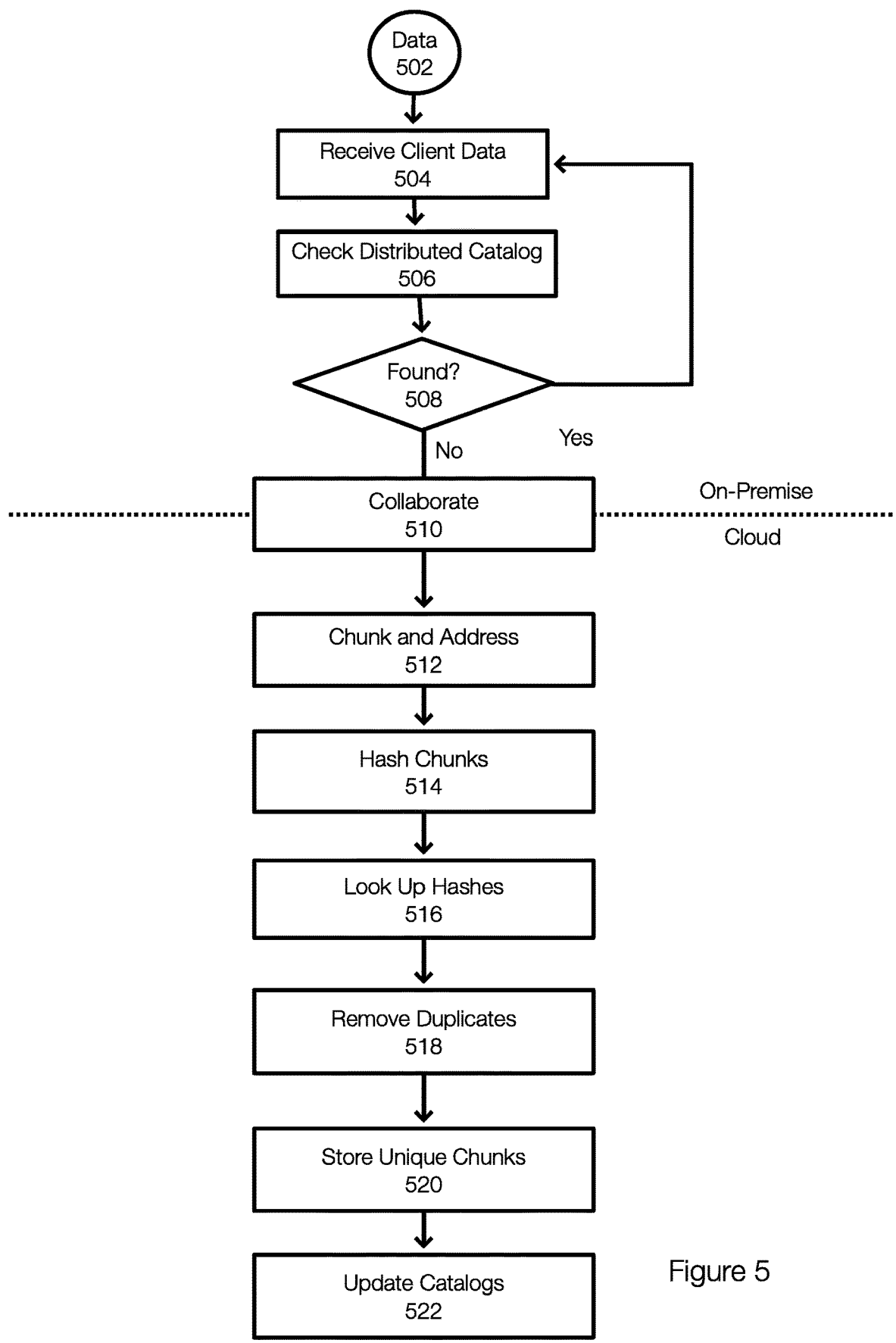
FIG. 5 illustrates an example of a method for performing ring-based collaborative deduplication.

FIG. 5 illustrates an example of ring based collaborative deduplication. In FIG. 5, data 502 (e.g., files) are received 504 from one or more edge devices. The files are checked 506 against a distribute catalog associated with a ring of nodes. In one example, each of the nodes of the ring may store part of the distributed catalog. Depending on the replication factor, a particular node may store the local catalogs of several nodes. As a result, the files in the data 502 can be checked against the local portion of the distributed catalog. In another example, the edge node may also check the files in the data 202 against other portions of the distributed catalog at other nodes.

If the file is found (Yes at 508), the file is not sent, although a pointer may be sent to the deduplication engine. If the file is not found (No at 508), then the node or ring of nodes may collaborate with the deduplication engine. Lists from each of the nodes in the ring may be uploaded to the deduplication engine at 510. The deduplication engine may then instruct each of the nodes to upload files identified by the deduplication engine from the lists. Each node receives its own list of files or data to be uploaded for further deduplication by the deduplication engine. In this manner, the deduplication engine may receive files that are unique with respect to a ring of nodes rather than a specific node.

The deduplication engine may then proceed as previously described. Elements 512-520 are similar to elements 308-316 of FIG. 3B. Next, the distributed catalogs are updated 522 after deduplication at the cloud level. Each distributed catalog receives a relevant update from the global catalog associated with the deduplication engine operating in the cloud.

When the local or distributed catalog is updated, the local or distributed catalog is updated to reflect the new files that were uploaded during the last transfer window. This allows files in the next transfer window to be deduplicated, at the edge node, against the files previously known to the node or ring as well as the files that were most recently uploaded and deduplicated.

The deduplication performed at the deduplication engine in the cloud allows the files from the nodes to be deduplicated against other nodes or rings of nodes. This advantageously can reduce the amount of data transferred from the nodes to the deduplication engine and can reduce the amount of data subsequently stored in the backend storage.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations including collaborative deduplication operations and data transfer reduction operations. More generally, the scope of the invention embraces any operating environment in which the disclosed concepts may be useful.

At least some embodiments of the invention provide for the implementation of the disclosed functionality in existing backup platforms, examples of which include the Dell-EMC CloudBoost platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method for collaboratively deduplicating data, the method comprising: receiving data from an edge device at an extension engine operating on an edge node, checking the data using a local catalog to determine which files in the data have been transmitted to a deduplication engine operating in a datacenter, wherein the local catalog includes metadata configured to determine that first files in the data that have been previously sent to the deduplication engine and that second files in the data have not been sent to the deduplication engine based on the local catalog, collaborating, by the extension engine and the deduplication engine identify third files from the second files that have been deduplicated, transmitting the third files to the deduplication engine, deduplicating, by the deduplication engine, the third files, and updating the local catalog such that the local catalog reflects that the third files have been deduplicated by the deduplication engine.

Embodiment 2. The method of embodiment 1, further comprising identifying the third files based on a global catalog accessible to the deduplication engine, wherein the global catalog associates data from the source with hashes of deduplicated files.

Embodiment 3. The method of embodiment 1 and/or 2, further comprising generating a list of the second files and transmitting the list to the deduplication engine.

Embodiment 4. The method of embodiment 1, 2, and/or 3, further comprising determining the third files from the list and the global catalog.

Embodiment 5. The method of embodiment 1, 2, 3, and/or 4, further comprising instructing the extension engine to transmit the third files to the deduplication engine.

Embodiment 6. The method of embodiment 1, 2, 3, 4, and/or 5, further comprising deduplicating the third files by chunking the files, comparing hashes of the chunks with hashes stored in the global catalog, and storing new chunks in storage of the cloud.

Embodiment 7. The method of embodiment 1, 2, 3, 4, 5, and/or 6, further comprising providing the deduplication engine with pointers to the first files and the second files that are not transmitted to the deduplication engine.

Embodiment 8. The method of embodiment 1, 2, 3, 4, 5, 6, and/or 8, wherein the deduplication engine receives a list from multiple extension mechanisms at multiple edge nodes and each extension mechanism identifies third files, further comprising deduplicating all of the third files.

Embodiment 9. The method of embodiment 1, 2, 3, 4, 5, 6, 7, and/or 8, further comprising updating each of the extension engines based on their corresponding lists.

Embodiment 10. The method of embodiment 1, 2, 3, 4, 5, 6, 7, 8, and/or 9, wherein checking the data using a local catalog includes deduplicating based on chunks having a larger size than chunks used by the deduplication engine.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1 through 11

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for collaboratively deduplicating data, the method comprising:
receiving data from an edge device at an extension engine operating on an edge node, wherein the edge node has aggregated the data to be receive during a transfer window based on a list and the extension engine identifies files;
checking, by the extension engine, the data using a local catalog to determine files in the data that have been previously transmitted to a deduplication engine operating in a datacenter, wherein the local catalog includes metadata configured to determine that first files in the data have been previously sent to the deduplication engine and that second files in the data have not been sent to the deduplication engine based on the local catalog;
collaborating over a time period, by the extension engine and the deduplication engine, to identify third files from the second files that have not been deduplicated by the deduplication engine based on a global catalog accessible to the deduplication engine, wherein the global catalog associates data with hashes of deduplicated files;
transmitting the third files to the deduplication engine;
deduplicating, by the deduplication engine, the third files; and
updating the local catalog such that the local catalog reflects that the third files have been deduplicated by the deduplication engine.

2. The method of claim 1, further comprising generating a list of the second files and transmitting the list to the deduplication engine.

3. The method of claim 2, further comprising determining the third files from the list and the global catalog.

4. The method of claim 3, further comprising instructing the extension engine to transmit the third files to the deduplication engine.

5. The method of claim 1, further comprising deduplicating the third files by chunking the files, comparing hashes of the chunks with hashes stored in the global catalog, and storing new chunks in storage of a cloud.

6. The method of claim 1, wherein checking the data using the local catalog includes deduplicating based on chunks having a larger size than chunks used by the deduplication engine.

7. The method of claim 1, wherein the deduplication engine receives a list from multiple extension mechanisms at multiple edge nodes and each extension mechanism identifies third files, further comprising deduplicating all of the third files.

8. The method of claim 7, further comprising updating each of the extension engines based on the list.

9. A non-transitory storage medium having stored therein instructions that are executable by one or more hardware processors to perform operations comprising:
receiving data from an edge device at an extension engine operating on an edge node, wherein the edge node has aggregated the data to be received during a transfer window based on a list and the extension engine identifies files;
checking, by the extension engine, the data using a local catalog to determine files in the data that have been previously transmitted to a deduplication engine operating in a datacenter, wherein the local catalog includes metadata configured to determine that first files in the data that have been previously sent to the deduplication engine and that second files in the data have not been sent to the deduplication engine based on the local catalog;
collaborating over a time period, by the extension engine and the deduplication engine identify third files from the second files that have not been deduplicated by the deduplication engine based on a global catalog accessible to the deduplication engine, wherein the global catalog associates data with hashes of deduplicated files;
transmitting the third files to the deduplication engine;
deduplicating, by the deduplication engine, the third files; and
updating the local catalog such that the local catalog reflects that the third files have been deduplicated by the deduplication engine.

10. The non-transitory storage medium of claim 9, further comprising generating a list of the second files and transmitting the list to the deduplication engine.

11. The non-transitory storage medium of claim 10, further comprising determining the third files from the list and the global catalog.

12. The non-transitory storage medium of claim 11, further comprising instructing the extension engine to transmit the third files to the deduplication engine.

13. The non-transitory storage medium of claim 9, further comprising deduplicating the third files by chunking the files, comparing hashes of the chunks with hashes stored in the global catalog, and storing new chunks in storage of a cloud.

14. The non-transitory storage medium of claim 9, further comprising providing the deduplication engine with pointers to the first files and the second files that are not transmitted to the deduplication engine.

15. The non-transitory storage medium of claim 9, wherein the deduplication engine receives a list from multiple extension mechanisms at multiple edge nodes and each extension mechanism identifies third files, further comprising deduplicating all of the third files.

16. The non-transitory storage medium of claim 15, further comprising updating each of the extension engines based on the list.

* * * * *